(12) United States Patent
Kirby

(10) Patent No.: US 10,458,023 B2
(45) Date of Patent: Oct. 29, 2019

(54) LANTHANUM MOLYBDATE ABRADABLE COATINGS, THEIR METHODS OF FORMATION AND USE

(71) Applicant: General Electric Company, Schenectady, NY (US)

(72) Inventor: Glen Harold Kirby, Evandale, OH (US)

(73) Assignee: General Electric Company, Schenectady, NY (US)

(*) Notice: Subject to any disclaimer, the term of this patent is extended or adjusted under 35 U.S.C. 154(b) by 307 days.

(21) Appl. No.: 15/313,218

(22) PCT Filed: Apr. 24, 2015

(86) PCT No.: PCT/US2015/027415
§ 371 (c)(1),
(2) Date: Nov. 22, 2016

(87) PCT Pub. No.: WO2015/183439
PCT Pub. Date: Dec. 3, 2015

(65) Prior Publication Data
US 2017/0183782 A1   Jun. 29, 2017

Related U.S. Application Data

(60) Provisional application No. 62/003,180, filed on May 27, 2014.

(51) Int. Cl.
*C23C 30/00* (2006.01)
*C23C 28/00* (2006.01)
(Continued)

(52) U.S. Cl.
CPC .......... *C23C 28/3455* (2013.01); *C04B 35/50* (2013.01); *C04B 35/62222* (2013.01);
(Continued)

(58) Field of Classification Search
CPC ... C23C 28/3455; C23C 28/042; C23C 30/00; C23C 28/347; C23C 28/345;
(Continued)

(56) References Cited

U.S. PATENT DOCUMENTS 7,972,657 B2   7/2011   Schlichting et al.
8,231,958 B2   7/2012   Hoover et al.
(Continued)

FOREIGN PATENT DOCUMENTS

EP   2192098 A2   6/2010

OTHER PUBLICATIONS

Han et al., "Sol-Gel Deposition and Luminescence Properties of Lanthanide Ion-Doped Y2(1-X)Gd2xSiw08 (0<=X<=1) Phosphor Films", Applied physics A Materials science & Processing, vol. No. 80, Issue No. 7, pp. 1547-1552, Apr. 1, 2005.
(Continued)

*Primary Examiner* — Jonathan C Langman
(74) *Attorney, Agent, or Firm* — Dority & Manning, P.A.

(57) ABSTRACT

A coated substrate is provided that can include a substrate defining a surface, and an abradable coating on the surface of the substrate. The abradable coating can comprise $La_{2-x}A_xMo_{2-y-y'}W_yB_{y'}O_{9-\delta}$ forming a crystalline structure, where A comprises Li, Na, K, Rb, Cs, Sc, Y, Ce, Pr, Nd, Pm, Sm, Eu, Gd, Tb, Dy, Ho, Er, Tm, Yb, Lu, Th, Be, Mg, Ca, Sr, Ba, Cu, Bi, Cd, Zn, Ag, Au, Pt, Ir, Rh, Ru, Pd, or combinations thereof; $0<x\leq about\ 0.2$ (e.g., about $0.1\leq x\leq about\ 0.15$); $0\leq y\leq about\ 1.5$ (e.g., about $0.01\leq y\leq about\ 1.5$); B comprises Ta, Nb, V, Fe, Cr, Mn, Co, Ni, Sn, Ga, Al, Re, In, S, or combinations thereof; $0\leq y'\leq about\ 0.2$, wherein the sum of y and y' is about 0.01 to about 1.6; and $0\leq\delta\leq about\ 0.2$.

26 Claims, 3 Drawing Sheets

(51) Int. Cl.
    C23C 28/04    (2006.01)
    F01D 5/28     (2006.01)
    C04B 35/50    (2006.01)
    C04B 35/622   (2006.01)
    F01D 11/12    (2006.01)

(52) U.S. Cl.
    CPC ......... *C23C 28/042* (2013.01); *C23C 28/044* (2013.01); *C23C 28/3215* (2013.01); *C23C 28/345* (2013.01); *C23C 28/347* (2013.01); *C23C 30/00* (2013.01); *F01D 5/284* (2013.01); *F01D 5/288* (2013.01); *F01D 11/122* (2013.01); *C04B 2235/326* (2013.01); *C04B 2235/3227* (2013.01); *C04B 2235/3256* (2013.01)

(58) Field of Classification Search
    CPC . C23C 28/3215; C23C 28/044; F01D 11/122; F01D 5/284; F01D 5/288; C04B 35/50; C04B 35/62222; C04B 2235/326; C04B 2235/3227; C04B 2235/3256
    See application file for complete search history.

(56) References Cited

U.S. PATENT DOCUMENTS

| | | | |
|---|---|---|---|
| 8,658,255 B2 | 2/2014 | Kirby et al. | |
| 2003/0160216 A1* | 8/2003 | Goutenoire | B01D 53/228 252/500 |
| 2004/0060967 A1* | 4/2004 | Yang | H01M 8/2432 228/122.1 |
| 2006/0292416 A1* | 12/2006 | Armstrong | C01G 1/02 252/518.1 |
| 2010/0227146 A1 | 9/2010 | Larose | |
| 2010/0297527 A1* | 11/2010 | Armstrong | H01M 8/1253 429/491 |
| 2012/0204951 A1 | 8/2012 | Wang et al. | |
| 2013/0089673 A1 | 4/2013 | Kirby et al. | |
| 2013/0089720 A1 | 4/2013 | Kirby et al. | |

OTHER PUBLICATIONS

Laffez et al., "Growth of La2MO2O9 Films on Porous Al2O3 Substrates by Radio Frequency Magnetron Sputtering", Thin solid films, vol. No. 500, Issue No. 1-2, pp. 27-33, Apr. 3, 2006.

Briois et al., "A Comparison of Electrical Properties Of Sputter-Deposited Electrolyte Coatings Dedicated to Intermediate Temperature Solid Oxide Fuel Cells", Surface and coatings Technology, vol. No. 201, Issue No. 3-4, pp. 1328-1334, Oct. 5, 2006.

Winter et al., "Oxide Materials With Low Thermal Conductivity", Journal of the American ceramic society, vol. No. 90, Issue No. 2, pp. 533-540, Feb. 1, 2007.

Pinet et al., "Conductivity of Reduced La2Mo2O9 Based Oxides the Effect of Tungsten Substitution", Materials research bulletin, vol. No. 42, Issue No. 5, pp. 935-942, Mar. 16, 2007.

Weber et al., "Pure and GD Doped LAMOX Powders and Thin Films Obtained by Chemical Route", Materials science and technology, vol. No. 25, Issue No. 11, pp. 1346-1350, Nov. 1, 2009.

PCT Invitation to Pay Additional Fees issued in connection with corresponding PCT Application No. PCT/US2015/027415 dated Jul. 17, 2015.

PCT Search Report and Written Opinion issued in connection with corresponding PCT Application No. PCT/US15/033646 dated Nov. 18, 2015.

PCT Search Report and Written Opinion issued in connection with corresponding PCT Application No. PCT/US2015/027415 dated Dec. 11, 2015.

* cited by examiner

LANTHANUM MOLYBDATE ABRADABLE COATINGS, THEIR METHODS OF FORMATION AND USE

PRIORITY INFORMATION

This application is a national stage application under application under 35 U.S.C. § 371(c) of prior filed PCT application serial number PCT/US2015/027415 filed on Apr. 24, 2015, which claims priority to U.S. Provisional Patent Application Ser. No. 62/003,180 titled "Lanthanum Molybdate Abradable Coatings for Metal Shrouds and Their Methods of Formation and Use" of Glen Harold Kirby filed on 27 May 2014. The above-listed applications are incorporated by reference herein.

TECHNICAL FIELD

Embodiments of the present invention relate generally to turbines. More specifically, embodiments of the invention generally relate to abradable coatings for metal shrouds, particularly those metal shrouds in gas turbine engines.

BACKGROUND

The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by combustion of a fuel. Gas turbine buckets or blades generally have an airfoil shape designed to convert the thermal and kinetic energy of the flow path gases into mechanical rotation of the rotor.

Turbine performance and efficiency may be enhanced by reducing the space between the tip of the rotating blade and the stationary shroud to limit the flow of air over or around the top of the blade that would otherwise bypass the blade. For example, a blade may be configured so that its tip fits close to the shroud during engine operation. Thus, generating and maintaining an efficient tip clearance may be particularly desired for efficiency purposes.

Although turbine blades may be made of a number of superalloys (e.g., nickel-based superalloys), ceramic matrix composites (CMCs) are an attractive alternative to nickel-based superalloys for turbine applications because of their high temperature capability and light weight. However, CMC components must be protected with an environmental barrier coating (EBC) in turbine engine environments to avoid severe oxidation and recession in the presence of high temperature steam.

Thus, in certain components, regions of the EBC may be susceptible to wear due to rub events with adjacent components. For example, for the CMC blade, the EBC at the blade tip is susceptible to rub against metal shroud components. If the EBC coating wears away, the CMC blade is then open to recessive attack from high temperature steam that will open up the clearance between the CMC blade tip and the metal shroud, thereby reducing the efficiency of the engine.

Thus, it may be desirable in the art to provide materials and methods for reducing EBC wear on a CMC blade tip caused by a rub event during operation of a turbine.

BRIEF DESCRIPTION

Aspects and advantages of embodiments of the invention will be set forth in part in the following description, or may be obvious from the description, or may be learned through practice of embodiments of the invention.

A coated substrate is generally provided, along with methods of its manufacture and coating. In one embodiment, the coated substrate includes a substrate defining a surface, and an abradable coating on the surface of the substrate. The abradable coating can comprise $La_{2-x}A_xMo_{2-y-y'}W_yB_{y'}O_{9-\delta}$ forming a crystalline structure, where A comprises Li, Na, K, Rb, Cs, Sc, Y, Ce, Pr, Nd, Pm, Sm, Eu, Gd, Tb, Dy, Ho, Er, Tm, Yb, Lu, Th, Be, Mg, Ca, Sr, Ba, Cu, Bi, Cd, Zn, Ag, Au, Pt, Ir, Rh, Ru, Pd, or combinations thereof; $0 < x \leq$ about 0.2 (e.g., about $0.1 \leq x \leq$ about 0.15); $0 \leq y \leq$ about 1.5 (e.g., about $0.01 \leq y \leq$ about 1.5); B comprises Ta, Nb, V, Fe, Cr, Mn, Co, Ni, Sn, Ga, Al, Re, In, S, or combinations thereof; $0 \leq y' \leq$ about 0.2, wherein the sum of y and y' is about 0.01 to about 1.6; and $0 \leq \delta \leq$ about 0.2.

Another embodiment includes a substrate having the formula: $La_{2-x}Y_xMo_{2-y-y'}W_yB_{y'}O_{9-\delta}$, forming a crystalline structure, where about $0.05 \leq x \leq$ about 0.15; $0 \leq y \leq$ about 1.5; about $0.01 \leq y' \leq$ about 0.2; and $0 \leq \delta \leq$ about 0.2.

Yet another embodiment includes a substrate having the formula: $La_{2-x}Y_xMo_{2-y}W_yO_{9-\delta}$, forming a crystalline structure, where about $0.05 \leq x \leq$ about 0.15; $0 \leq y \leq$ about 1.5; about $0.01 \leq y' \leq$ about 0.2; and $0 \leq \delta \leq$ about 0.2.

A gas turbine is also provided that includes the coated substrate described above. For example, the coated substrate can defines a metal shroud positioned adjacent to CMC blade tips, and wherein upon contact with a CMC blade tip, a portion of the abradable coating is removed from the metal shroud.

These and other features, aspects and advantages of embodiments of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the embodiments of the invention is particularly pointed out and distinctly claimed in the concluding part of the specification. The embodiments of the invention, however, may be best understood by reference to the following description taken in conjunction with the accompanying drawing figures in which:

DETAILED DESCRIPTION

Figure 1:
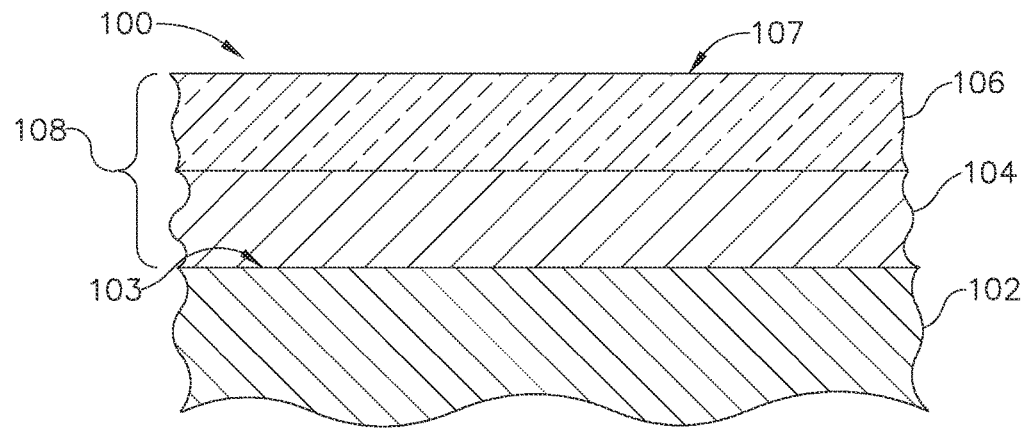
FIG. 1 shows a cross-sectional illustration of an exemplary coated substrate with an abradable coating thereon, according to one embodiment.

Reference now will be made in detail to embodiments of the invention, one or more examples of which are illustrated in the drawings. Each example is provided by way of explanation of the embodiments, not limitation of the embodiments. In fact, it will be apparent to those skilled in the art that various modifications and variations can be made in the present embodiments without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Abradable coatings are generally provided for a substrate, particularly those substrates in a turbine that are positioned in close contact to a CMC component (e.g., a CMC turbine blade). FIG. 1 shows is an illustration of a cross-section of a coated substrate 100 that includes a substrate 102 having a coating 108 on surface 103. The coating 108 generally includes an abradable coating 106 and an optional bond coating 104. The substrate 102 and coatings 104, 106 are discussed in greater detail below.

Figure 2:
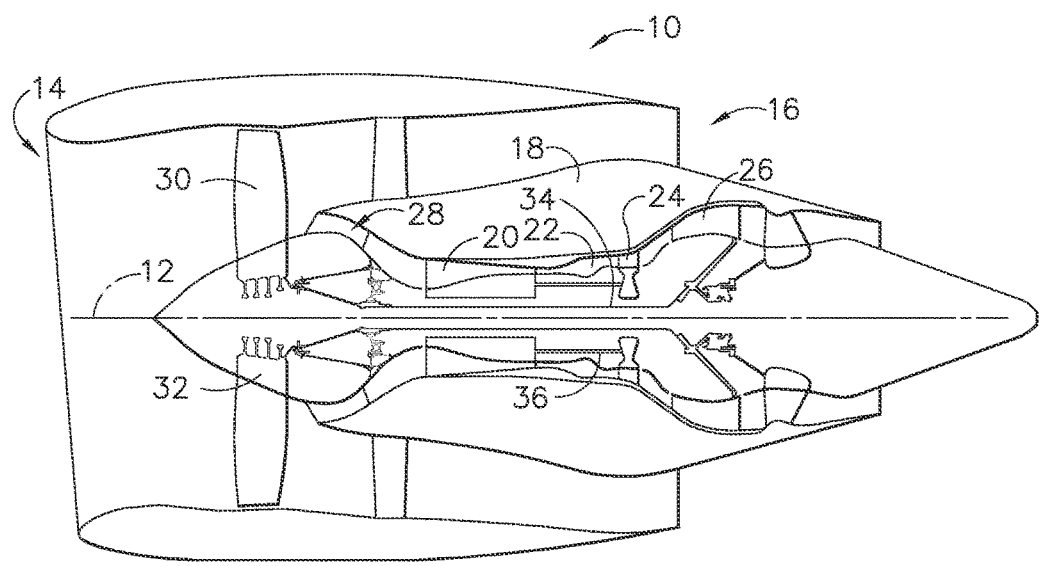
FIG. 2 shows a schematic illustration of an exemplary turbofan gas turbine engine assembly.

FIG. 2 is a schematic illustration of an exemplary turbofan engine assembly 10 having a central rotational axis 12. In the exemplary embodiment, turbofan engine assembly 10 includes an air intake side 14 and an exhaust side 16. Turbofan engine assembly 10 also includes a core gas turbine engine 18 that includes a high-pressure compressor 20, a combustor 22, and a high-pressure turbine 24. Moreover, turbofan engine assembly 10 includes a low-pressure turbine 26 that is disposed axially downstream from core gas turbine engine 18, and a fan assembly 28 that is disposed axially upstream from core gas turbine engine 22. Fan assembly 28 includes an array of fan blades 30 extending radially outward from a rotor hub 32. Furthermore, turbofan engine assembly 10 includes a first rotor shaft 34 disposed between fan assembly 28 and the low-pressure turbine 26, and a second rotor shaft 36 disposed between high-pressure compressor 20 and high-pressure turbine 24 such that fan assembly 28, high-pressure compressor 20, high-pressure turbine 24, and low-pressure turbine 26 are in serial flow communication and co-axially aligned with respect to central rotational axis 12 of turbofan engine assembly 10.

During operation, air enters through intake side 14 and flows through fan assembly 28 to high-pressure compressor 20. Compressed air is delivered to combustor 22. Airflow from combustor 22 drives high-pressure turbine 24 and low-pressure turbine 26 prior to exiting turbofan engine assembly 10 through exhaust side 16.

High-pressure compressor 20, combustor 22, high-pressure turbine 24, and low-pressure turbine 26 each include at least one rotor assembly. Rotary or rotor assemblies are generally subjected to different temperatures depending on their relative axial position within turbofan engine assembly 10. For example, in the exemplary embodiment, turbofan engine assembly 10 has generally cooler operating temperatures towards forward fan assembly 28 and hotter operating temperatures towards aft high-pressure compressor 20. As such, rotor components within high-pressure compressor 20 are generally fabricated from materials that are capable of withstanding higher temperatures as compared to fabrication materials for rotor components of fan assembly 28.

Figure 3:
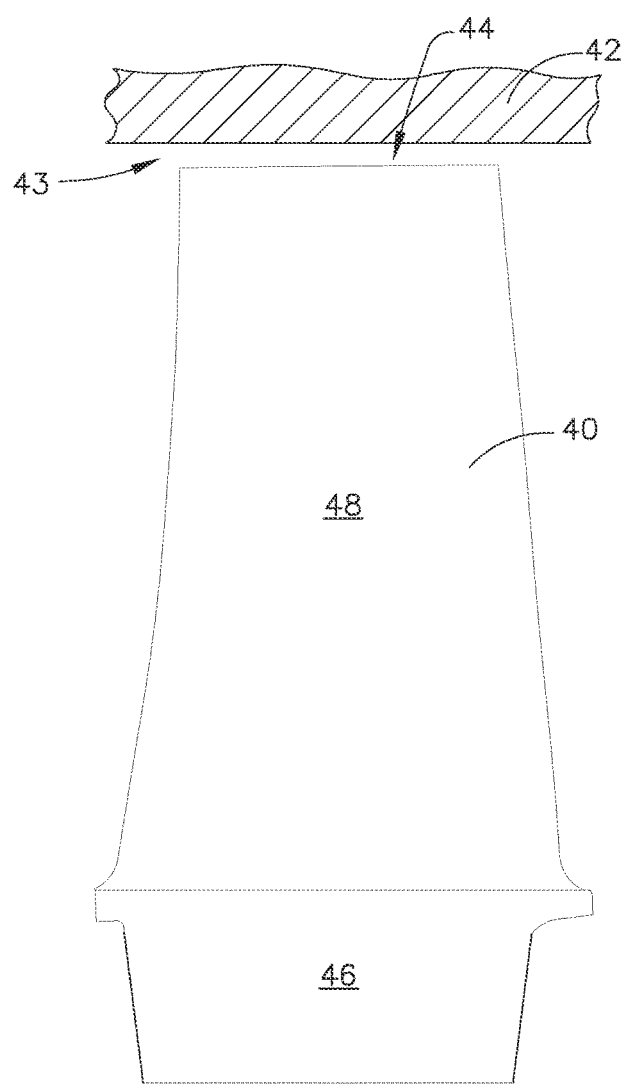
FIG. 3 shows a schematic illustration of an exemplary blade and shroud within a turbine.

The turbine assembly 10 comprises a plurality of rotor blades 40 and an outer shroud 42 concentrically disposed about rotor blades 40, as shown in FIG. 3. Rotor blade 40 comprises an inner root 46, an airfoil 48 and an outer tip 44. As best shown in FIG. 3, outer shroud 42 is spaced apart from blade tip 44 so as to define a clearance gap 43 therebetween. As generally discussed in the above background section, the performance and efficiency of the turbine is critically affected by clearance gap 43. The greater the amount of leakage flow through clearance gap 43, the greater the inefficiency of the turbine 10, as the leakage flow is not exerting motive forces on the blade surfaces and accordingly is not providing work. Thus, the blade tip 44 is positioned in close working proximity to the stationary shroud 42, such that rub or impact events are possible during operation of the turbine 10.

Although the present embodiments are described herein in connection with turbine assembly 10, the present embodiments are not limited to practice in turbine assembly 10. The present embodiments can be implemented and utilized in connection with many other configurations. Therefore, it should be understood that turbine assembly 10 is an exemplary assembly in which the present embodiments can be implemented and utilized.

In one particular embodiment, the coated substrate 100 forms the shroud 42, such the abradable coating 106 (as shown in FIG. 1) is facing the blade tip 44. For example, the abradable coating 106 may be on a metal shroud of a turbine that is in close operating proximity to a blade tip of a turbine blade. In a rub event between the blade tip 44 (e.g., a EBC coated CMC blade tip) and the coated substrate 100 (e.g., a coated metal shroud 42), the abradable coating 106 is configured to be softer than the EBC coating such that the abradable coating is removed from the substrate 102 instead of the EBC from the blade tip. The abradable coating is relatively dense, and generally mechanically resistant to spall in turbine engine environments. As discussed in greater detail below, the abradable coating generally includes a lanthanum molybdate-based material.

Although discussed hereinafter with respect to a metal shroud, the substrate coated with the abradable coating can be any component within the turbine, particularly metal components. When the substrate 100 is a metal component such as a metal shroud, a transitional layer 104 is, in particular embodiments, positioned between the metallic substrate 100 and the abradable coating 106. For example, the transitional layer 104 can be a passive aluminum oxide-based scale layer formed when the substrate material (e.g., the metal alloy itself or a bond coat deposited on the substrate) thermally oxidizes. The transitional layer 104 may be a bond coat, for example a diffusion coating. Suitable bond coatings would include, for example, nickel aluminide, platinum aluminide, aluminum, and aluminum oxide, or a combination thereof. Additionally, a bond coat with the formula MCrAlY; where M is Ni, Co, Fe, or mixtures thereof may be used.

As stated, the abradable coating 106 generally includes a lanthanum molybdate-based material. The lanthanum molybdate-based material provides the functionality of the shroud coating in terms of providing a surface that will give way on a rub or impact event. For example, when applied on a metal shroud, the lanthanum molybdate-based material provides the abradable functionality for a rub or impact event with a CMC blade tip without imposing severe wear on the EBC coating on the CMC blade tip.

When on a metal shroud, the high temperature cubic phase of this lanthanum molybdate-based material is the preferred form since it has a thermal expansion very similar to that of nickel- and cobalt-based superalloys. The cubic phase can be stabilized to room temperature or below (i.e., such that there is no phase transition during the temperature range of operation) over a wide range of lanthanum molybdate based compositions where the lanthanum and/or molybdenum is substituted by another element.

Generally, the lanthanum molybdate-based material is based on a parent structure of the formula: $La_2Mo_2O_9$. This parent structure has a with low temperature monoclinic structure, and thus is substituted by various other elements to form a cubic material over a broad range of temperatures (below room temperature to 1350° C. or higher). As such, the abradable coating comprises $La_{2-x}A_xMo_{2-y-y'}W_yB_{y'}O_{9-\delta}$ forming a crystalline structure, where A comprises Li, Na, K, Rb, Cs, Sc, Y, Ce, Pr, Nd, Pm, Sm, Eu, Gd, Tb, Dy, Ho, Er, Tm, Yb, Lu, Th, Be, Mg, Ca, Sr, Ba, Cu, Bi, Cd, Zn, Ag, Au, Pt, Ir, Rh, Ru, Pd, or combinations thereof; 0<x≤about 0.2 (i.e., x is greater than zero to about 0.2); 0≤y≤about 1.5 (i.e., y is zero to about 1.5); B comprises Ta, Nb, V, Fe, Cr, Mn, Co, Ni, Sn, Ga, Al, Re, In, S, or combinations thereof 0≤y'≤about 0.2 (i.e., y' is zero to about 0.2), wherein the sum of y and y' is about 0.01 to about 1.6; and 0≤δ≤about 0.2 (i.e., δ is zero to about 0.2). In particular embodiments, x is about 0.1 to about 0.15 (i.e., about 0.1≤x≤about 0.15).

As stated, A is generally comprises a rare earth element or a mixture of rare earth elements to combine with La in a similar site of the crystalline structure. In particular embodiments, A can include Y, Gd, Ce, Ca, Sr, Ba, or combinations thereof. For example, in one particular embodiment, A is Y such that the abradable coating comprises $La_{2-x}Y_xMo_{2-y-y'}W_yFe_{y'}O_{9-\delta}$ forming the crystalline structure, where about 0.05≤x≤about 0.15 (i.e., x is about 0.05 to about 0.15); 0≤y≤about 1.5 (i.e., y is zero to about 1.5); about 0.01≤y'≤about 0.2 (i.e., y' is about 0.01 to about 0.2); and 0≤δ≤about 0.2 (i.e., δ is zero to about 0.2).

When present, tungsten (W) can serve to stabilize the beta phase of the crystal structure in the abradable coating, and/or stabilize the cubic phase to lower temperatures. In certain embodiments, y is about 0.01 to about 1.5 (i.e., about 0.01≤y≤about 1.5) such that some amount of W is present in the crystal structure of the abradable coating. In such an embodiment, y' may be 0 such that no B element is present in the crystal structure of the abradable coating. Alternatively, y' may be greater than zero to about 0.15 (i.e., 0<y'≤about 0.15) such that both W and at least one B element is present in the crystal structure of the abradable coating. The level of W assists in adjusting the softness of the abradable coating.

As stated, B includes Ta, Nb, V, Fe, Cr, Mn, Co, Ni, Sn, Ga, Al, Re, In, S, or combinations thereof. B can be present with W (as stated above) or without W present in the crystal structure of the abradable coating (i.e., y is 0). In certain embodiments, B can help stabilize the cubic phase to a low temperature, particularly when B includes Ta, Nb, V, or combinations thereof. Additionally, B can help stabilize Mo in the crystal structure of the abradable coating by inhibiting Mo from changing its oxidation state (e.g., reducing), lower the processing temperature of the material, and/or reduce the interaction of the material with the metal substrate or bond coat. Such properties may be particularly achieved when B includes Fe, Cr, Mn, Co, Ni, Sn, Ga, Al, In, or combinations thereof.

In any case, the cubic phase of the crystalline material of these lanthanum molybdate materials provides an abradable coating with very low thermal expansion mismatch with the substrate (particularly a metallic substrate), and thus can be deposited as a dense, uncracked layer that is robust in terms of thermal cycling behavior in the engine, yet is soft enough to rub without rapidly removing EBC coating from a blade in case of an incursion event where a CMC blade tip contacts the cubic phase of these lanthanum molybdate materials.

Figure 4:
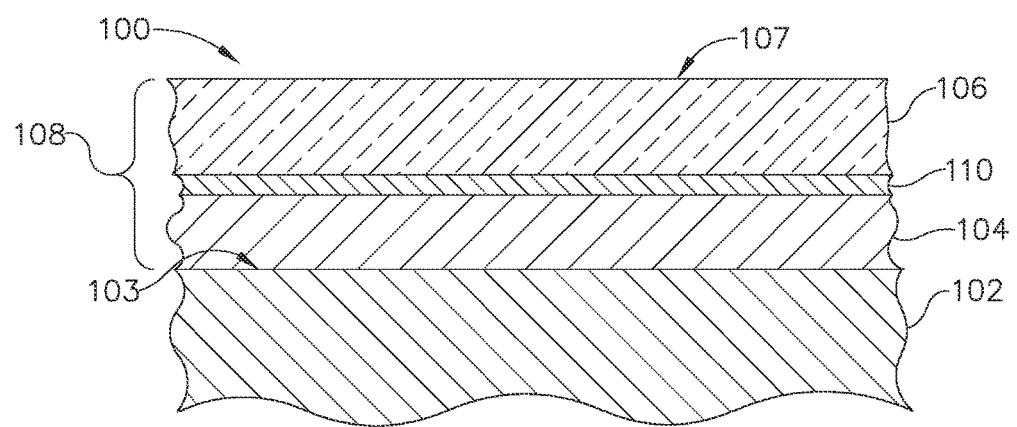
FIG. 4 shows a cross-sectional illustration of exemplary coated substrate with an abradable coating and thermal barrier coating (TBC) thereon, according to another embodiment.

For further durability, as shown in FIG. 4, an optional TBC 110 may be positioned between bond coat 104 and abradable coating 106. This TBC provides additional erosion resistance and serves as an additional, relatively hard layer, to mitigate risk of exposing bare substrate after a rub event or prolonged erosion. Options for TBC 110 would include, for example, rare earth zirconates and hafnates, such as scandium zirconate, yttrium zirconate, lanthanum zirconate, cerium zirconate, praseodymium zirconate, neodymium zirconate, promethium zirconate, samarium zirconate, europium zirconate, gadolinium zirconate, terbium zirconate, dysprosium zirconate, holmium zirconate, erbium zirconate, thulium zirconate, ytterbium zirconate, and lutetium zirconate, as well as scandium hafnate, yttrium hafnate, lanthanum hafnate, cerium hafnate, praseodymium hafnate, neodymium hafnate, promethium hafnate, samarium hafnate, europium hafnate, gadolinium hafnate, terbium hafnate, dysprosium hafnate, holmium hafnate, erbium hafnate, thulium hafnate, ytterbium hafnate, and lutetium hafnate, rare earth-doped zirconia with a cubic or tetragonal phase, rare earth-doped hafnia with a cubic or tetragonal phase, alkaline earth doped zirconia with a cubic or tetragonal phase, alkaline earth doped hafnia with a cubic or tetragonal phase, monoclinic hafnia, or combinations thereof. Application methods and thickness of the TBC 110 would range from about 0.003 inches to about 0.030 inches, and could be higher based on a component's particular need. Other descriptions of TBC are found in U.S. Provisional Patent Application Ser. No. 62/069,346 titled "Thermal and Environmental Barrier Coating Compositions and Methods of Deposition" filed on Oct. 28, 2014, and U.S. Provisional Patent Application Ser. No. 62/018,983 titled "Thermal and Environmental Barrier Coating Compositions and Methods of Deposition" filed on Jun. 30, 2014, the disclosures of which are incorporated by reference herein.

While embodiments of the invention have been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose embodiments of the invention, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated turbine shroud comprising, a turbine shroud defining a surface and an abradable coating on the surface of the turbine shroud having the formula: $La_{2-x}A_xMo_{2-y-y'}W_yB_{y'}O_{9-\delta}$, forming a crystalline structure, wherein:
   A comprises Li, Na, K, Rb, Cs, Sc, Y, Ce, Pr, Nd, Pm, Sm, Eu, Gd, Tb, Dy, Ho, Er, Tm, Yb, Lu, Th, Be, Mg, Ca, Sr, Ba, Cu, Bi, Cd, Zn, Ag, Au, Pt, Ir, Rh, Ru, Pd, or combinations thereof;
   0<x≤about 0.2;
   0<y≤about 1.5;

B comprises Ta, Nb, V, Fe, Cr, Mn, Co, Ni, Sn, Ga, Al, Re, In, S, or combinations thereof;

$0 \leq y' \leq$ about 0.2, wherein the sum of y and y' is about 0.01 to about 1.6; and $0 \leq \delta \leq$ about 0.2.

2. The coated turbine shroud of claim 1, the abradable coating comprising A selected from the group consisting of Y, Yb, Gd, Ce, Ca, Sr, Ba, and combinations thereof.

3. The coated turbine shroud of claim 1, the abradable coating comprising A selected from the group consisting of Y and Yb and combinations thereof.

4. The coated turbine shroud of claim 1, the abradable coating comprising y is 0.

5. The coated turbine shroud of claim 1, the abradable coating comprising y' is 0.

6. The coated turbine shroud of claim 1, the abradable coating comprising $0 < y' \leq$ about 0.15.

7. The coated turbine shroud of claim 1, the abradable coating comprising B selected from the group consisting of Ta, Nb, V, or combinations thereof.

8. The coated turbine shroud of claim 1, the abradable coating comprising B selected from the group consisting of Fe, Cr, Mn, Co, Ni, Sn, Ga, Al, In, or combinations thereof.

9. The coated turbine shroud of claim 1, the abradable coating comprising B is Fe.

10. The coated turbine shroud of claim 1, wherein the crystalline structure has a single phase structure with no more than about 10% by volume of a secondary phase.

11. The coated turbine shroud of claim 10, wherein the single phase structure is a cubic phase crystalline structure.

12. The coated turbine shroud of claim 1, wherein the abradable coating is about 0.005 inches or greater in thickness.

13. The coated turbine shroud of claim 1, wherein the turbine shroud comprises a superalloy with a base metal selected from the group consisting of Ni, Cr, and Co, or a combination thereof.

14. The coated turbine shroud of claim 1, further comprising a bond coat positioned between the turbine shroud and the abradable coating.

15. The coated turbine shroud of claim 14, wherein the bond coat is a diffusion coating selected from the group consisting of nickel aluminide, platinum aluminide, aluminum, and aluminum oxide, or a combination thereof.

16. The coated turbine shroud of claim 14, wherein the bond coat has the formula MCrAlY; where M is Ni, Co, Fe, or mixtures thereof.

17. The coated turbine shroud of claim 14, further comprising a TBC positioned between the bond coat and the abradable coating.

18. The coated turbine shroud of claim 17, wherein the TBC is a zirconate selected from the group consisting of scandium zirconate, yttrium zirconate, lanthanum zirconate, cerium zirconate, praseodymium zirconate, neodymium zirconate, promethium zirconate, samarium zirconate, europium zirconate, gadolinium zirconate, terbium zirconate, dysprosium zirconate, holmium zirconate, erbium zirconate, thulium zirconate, ytterbium zirconate, and lutetium zirconate, or a combination thereof.

19. The coated turbine shroud of claim 17, wherein the TBC is a hafnate selected from the group consisting of scandium hafnate, yttrium hafnate, lanthanum hafnate, cerium hafnate, praseodymium hafnate, neodymium hafnate, promethium hafnate, samarium hafnate, europium hafnate, gadolinium hafnate, terbium hafnate, dysprosium hafnate, holmium hafnate, erbium hafnate, thulium hafnate, ytterbium hafnate, and lutetium hafnate, or a combination thereof.

20. A coated substrate turbine component comprising, a turbine shroud defining a surface and an abradable coating on the surface of the turbine shroud having the formula: $La_{2-x}Y_xMo_{2-y-y'}W_yB_{y'}O_{9-\delta}$, forming a crystalline structure, wherein:

about $0.05 \leq x \leq$ about 0.15;

$0 \leq y \leq$ about 1.5;

B comprises Ta, Nb, V, Fe, Cr, Mn, Co, Ni, Sn, Ga, Al, Re, In, S, or combinations thereof;

about $0.01 \leq y' \leq$ about 0.2; and $0 \leq \delta \leq$ about 0.2.

21. The coated turbine shroud of claim 20, the abradable coating comprising y is 0, and comprising about $0.05 < y' <$ about 0.2.

22. A coated turbine shroud comprising, a turbine shroud defining a surface and an abradable coating on the surface of the turbine shroud having the formula: $La_{2-x}Y_xMo_{2-y}W_yO_{9-\delta}$, forming a crystalline structure, wherein:

about $0.05 \leq x \leq$ about 0.15;

$0 \leq y \leq$ about 1.5;

about $0.01 \leq y' \leq$ about 0.2; and $0 \leq \delta \leq$ about 0.2.

23. The coated turbine shroud of claim 22, the abradable coating comprising y is 0, and optionally about $0.05 \leq y' \leq$ about 0.2.

24. A gas turbine comprising the coated turbine shroud of claim 1, wherein the coated turbine shroud is positioned adjacent to a blade tip, and wherein upon contact with a blade tip, a portion of the abradable coating is removed from the shroud.

25. The gas turbine of claim 24, wherein the blade tip is a CMC blade tip.

26. The gas turbine of claim 25, the blade tip further comprising an EBC, wherein the rate of abradable coating removal from the shroud is slower than the rate of EBC removal from the blade tip.

* * * * *